United States Patent [19]
Kinoshita et al.

[11] 4,301,886
[45] Nov. 24, 1981

[54] FRONT WHEEL DRIVE

[75] Inventors: Mikio Kinoshita, Izumisano; Mitsuhiro Kutomi, Izumiotsu, both of Japan

[73] Assignee: Kubota, Ltd., Osaka, Japan

[21] Appl. No.: 75,164

[22] Filed: Sep. 12, 1979

[30] Foreign Application Priority Data

Mar. 23, 1979 [JP] Japan ............................. 54-38581[U]

[51] Int. Cl.³ .............................................. B60K 17/30
[52] U.S. Cl. .................................... 180/261; 180/233
[58] Field of Search ................... 180/262, 261, 233

[56] References Cited

U.S. PATENT DOCUMENTS

| 1,296,216 | 3/1919 | Reif | 180/262 |
| 1,332,579 | 3/1920 | Stewart | 180/262 |
| 1,402,580 | 1/1922 | Ditmars | 180/262 |
| 2,456,865 | 12/1948 | Cottingham | 180/262 |
| 3,469,646 | 9/1969 | O'Connor | 180/261 |
| 3,980,151 | 9/1976 | Murayama et al. | 180/261 |

Primary Examiner—Joseph F. Peters, Jr.
Assistant Examiner—Donn McGiehan
Attorney, Agent, or Firm—Haseltine and Lake

[57] ABSTRACT

In a drive for driving front wheels through transmissions disposed at the ends of front axles to be drivingly rotated, a cylindrical front axle case for enveloping and rotatably supporting the front axles is integrally formed with transmission cases for enveloping and rotatably supporting the transmissions.

3 Claims, 5 Drawing Figures

FRONT WHEEL DRIVE

BACKGROUND OF THE INVENTION

The present invention relates to a front wheel drive in a power vehicle such as a tractor.

In order to increase the force of traction and hill climbing ability, a drive of the all wheel driving type has conventionally been proposed in a tractor of the 2-axle 4-wheel type. In such a case, the front wheel drive has generally been formed such that a differential gearing and a gear transmission are covered by an axle case and a gear case, respectively, and these cases are coupled to each other by flanged bolt couplings. In such construction, since the front wheels are arranged under the wheel arrayment for improving steering and manoeuvrability, the flanged bolt couplings will be subject to considerable external force, in particular, twisting external force, so that serious occurrences such as cutting or loosening of the bolts may result.

SUMMARY OF THE INVENTION

In view of the defects above-mentioned, it is an object of the present invention to provide a front wheel drive in which the front axle case may be prevented from breaking or deforming, even though twisting external force is produced by the front wheels to be driven under the wheel arrayment, and in which the front wheel assembly may easily be assembled or disassembled.

In order to achieve the object above-mentioned, the front wheel drive according to the present invention comprises a cylindrical front axle case, front axles rotatably journalled into the cylindrical front axle case, transmission cases integrally formed with the cylindrical front axle case and transmissions rotatably journalled into the transmission cases and adapted to be driven by the front axles, said transmissions adapted to drive front wheels.

According to the present invention, the front axle case and the transmission cases are formed integrally with each other without joint seams. The present invention is therefore very useful in that high durability may be provided and compact designing may be possible.

Other objects and advantages of the present invention will be apparent from the following detailed description.

DESCRIPTION OF THE PREFERRED EMBODIMENTS

Figure 1:
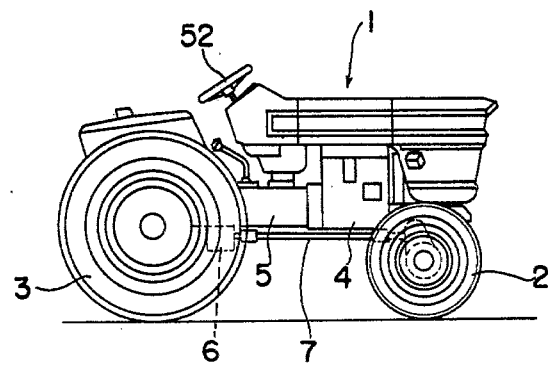
FIG. 1 is a schematic view showing the external appearance of a tractor to which a front wheel drive according to the present invention is applied.

In FIG. 1 showing one example of a power vehicle to which the present invention is applied, a tractor 1 has a pair of front wheels 2, a pair of rear wheels 3 and an engine 4. A transmission case 5 constitutes a vehicle body structure and is coupled to the engine 4. Incorporated in this transmission case 5 is a suitable transmission to drive the rear wheels 3 and a PTO shaft.

Power-take-off means 6 has change lever means (not shown), and transmission force from the rear wheels 3 is adapted to be transmitted to a propulsion shaft 7 for the front wheels.

Figure 2:
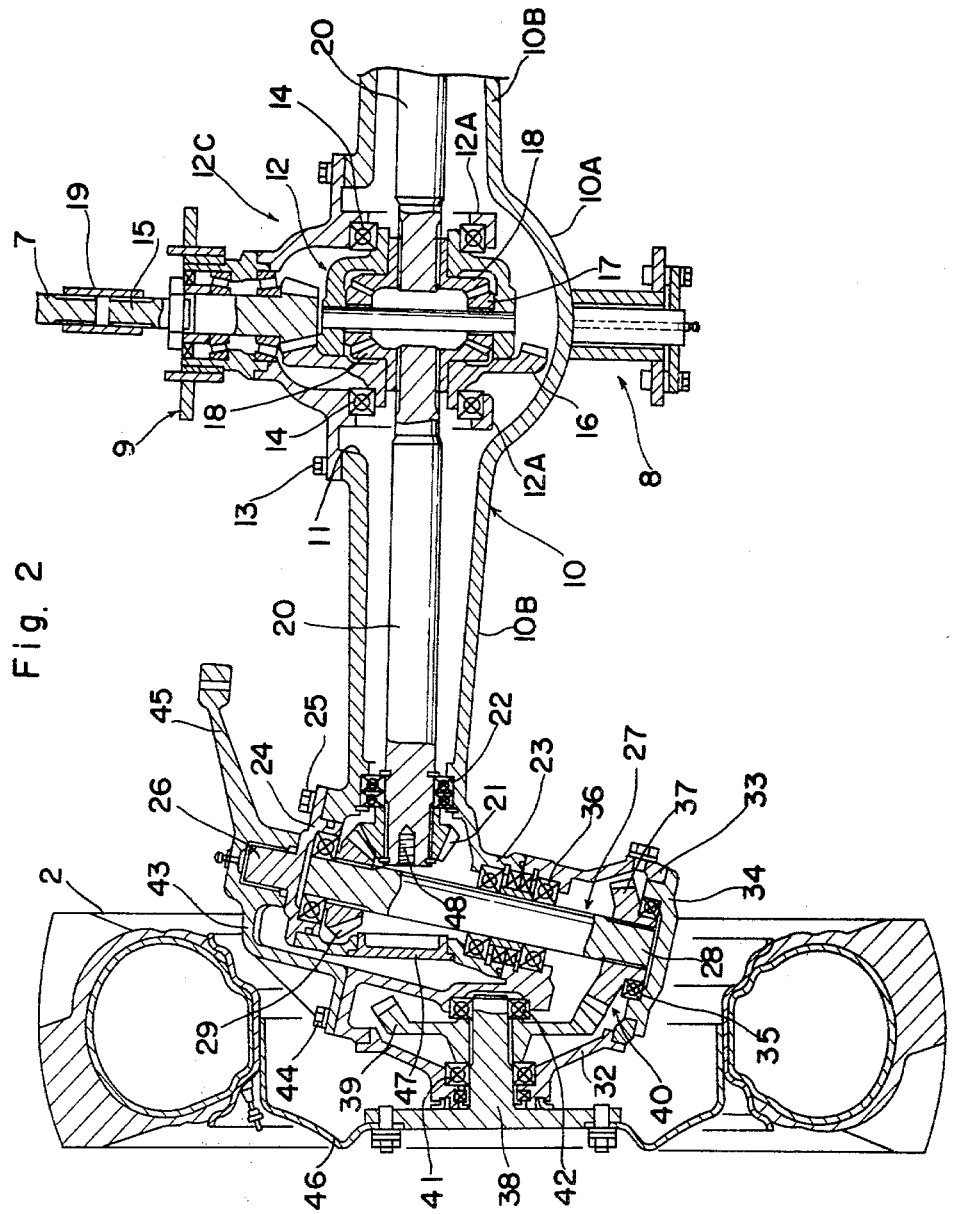
FIG. 2 is a sectional view of main portions of a first embodiment of the front wheel drive according to the present invention.
Figure 3:
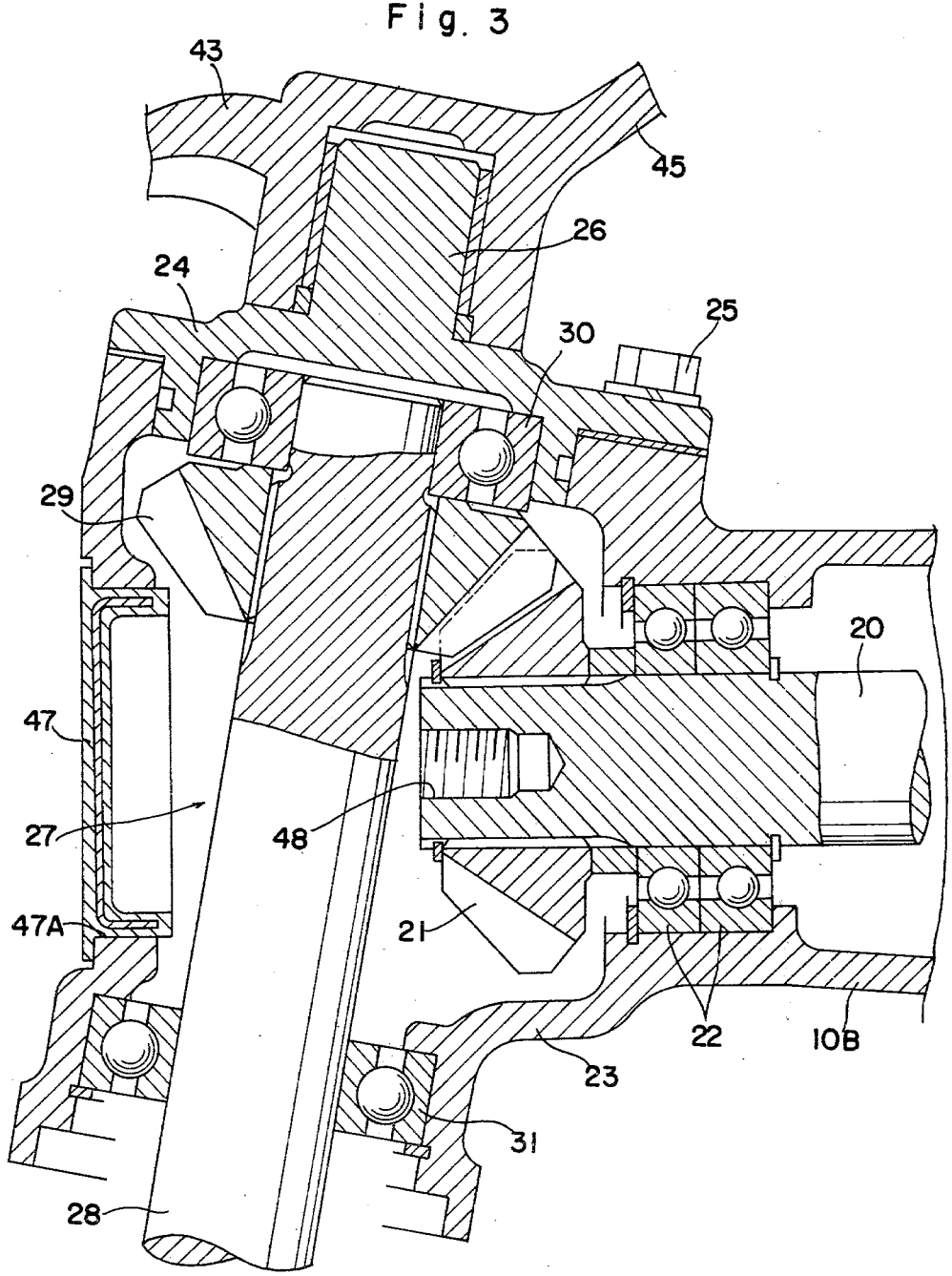
FIG. 3 is a sectional view of main portions of the front wheel drive.

FIGS. 2 and 3 illustrate in detail support means and drive means for the front wheel system.

Front axle supports 8 and 9 longitudinally separated from each other are disposed on a front wheel receiving frame. The front wheel assembly is supported by these supports 8 and 9 according to the center pin method.

A cylindrical front axle case 10 has a center casing portion 10A and a pair of axle casing portions 10B formed integrally with the center casing portion 10A at the both sides thereof. The center casing portion 10A has an opening 11 at the position opposite to the expanded portion of the center casing portion 10A. Secured to this opening 11 by bolts 13 or the like is a support assembling member 12C of a differential gearing 12 which closes this opening 11. This support assembling member 12C has a pair of bearing arms 12A, between which the differential gearing 12 is supported through a bearing 14. Thus, the differential gearing 12 is incorporated within the center casing portion 10A. The differential gearing 12 shown in this embodiment comprises a differential gearing drive shaft 15 and a bevel gear having a differential gear wheel 16, a differential pinion 17 and a differential side gear 18.

The propulsion shaft 7 is coupled to this differential gearing drive shaft 15 with a coupling 19.

A pair of differential gearing output shafts 20 serve as front axles and therefore these shafts 20 are hereinafter called front axles.

Each of the inner ends of these front axles 20 is slidably engaged with the differential gearing side gear 18 by splines or the like, and the outer ends of the front axles 20 are engaged with bevel pinions 21 by splines, respectively.

Since parts in connection with the front axles 20 are disposed in a symmetric manner, the description hereinafter will be made of only one side of the front axles 20.

The front axle 20 is enveloped with the cylindrical casing portion 10B of the axle case 10 and is rotatably journalled by a bearing 22. The cylindrical casing portion 10B, an article of cast metal, is tapered off and a transmission case 23 is cast and formed integrally with this cylindrical casing portion 10B. The transmission case 23 is formed in the cylindrical shape with openings at the upper and lower ends thereof and is extended downwardly from the cylindrical casing portion 10B.

A transmission case cover 24 is spigot-jointed and secured to the upper end 23A of the transmission case 23 with a bolt 25 and has a projecting shaft 26 formed integrally with the transmission case cover 24.

A transmission 27 comprises a king pin 28 and a bevel pinion 29 splined thereto. This bevel pinion 29 is meshed, from above in this embodiment, with the bevel pinion 21 at the outer end of the front axle 20. It is a matter of course that this bevel pinion 29 may alternately be meshed, from under side, with the bevel pinion 21.

The king pin 28 is journalled at the upper portion thereof to the transmission case cover 24 by a bearing 30 and at the intermediate portion thereof to the lower portion of the transmission case 23 by a bearing 31, so that this king pin 28 downwardly passes through the transmission case 23.

A reduction gearing case 32 has a projected casing portion 33. By a bearing 35, the king pin 28 is journalled at the lower portion thereof to a cover 34 disposed at the lower end of this projected casing portion 33. The king pin 28 is supported at the intermediate portion thereof by a bearing 36 at the boss of the projected casing portion 33. Thus, the king pin 28 is journalled at the upper and lower portions thereof and at two intermediate portions thereof.

A lower bevel pinion 37 is splined to the lower portion of the king pin 28 and is meshed with a bevel gear 39 splined to a hub shaft 38 such that the bevel pinion 37 and the bevel gear 39 form a reduction transmission 40.

The hub shaft 38 is located under the front axle 20 in parallel therewith. The reduction gearing case 32 is rotatably supported to this hub shaft 38 by a pair of bearings 41 and 42. A steering case 43 is securely fixed to the upper portion of the reduction gearing case 32 by a bolt 44. This steering case 43 is rotatably fitted to the projecting shaft 26 co-axial with the king pin 28 and has a steering arm 45 integrally formed therewith.

A front wheel 2 is disposed at the hub shaft 38 through a disc 46.

In the embodiment shown in FIGS. 2 and 3, a removable blind cap 47 made of rubber or plastic is disposed at the transmission case 23 at the position thereof opposite to the outer end of the front axle 20. An opening for attaching or removing this blind cap 47 is formed as having a diameter larger than that of bearings 22, since the bearings 22 are adapted to be inserted through this opening. It is a matter of course, however, that such blind cap 47 may not be disposed as shown in FIG. 5.

Furthermore, a tapped hole 48 is defined in the front axle 20 at the center position of the outer end thereof in FIGS. 2 and 3. Threaded connection or disconnection of a draw bolt into or from this tapped hole 48 permits the front axle 20 to be assembled or disassembled through the attachment/removal opening for the blind cap 47, as shown in FIG. 4.

Figure 4:
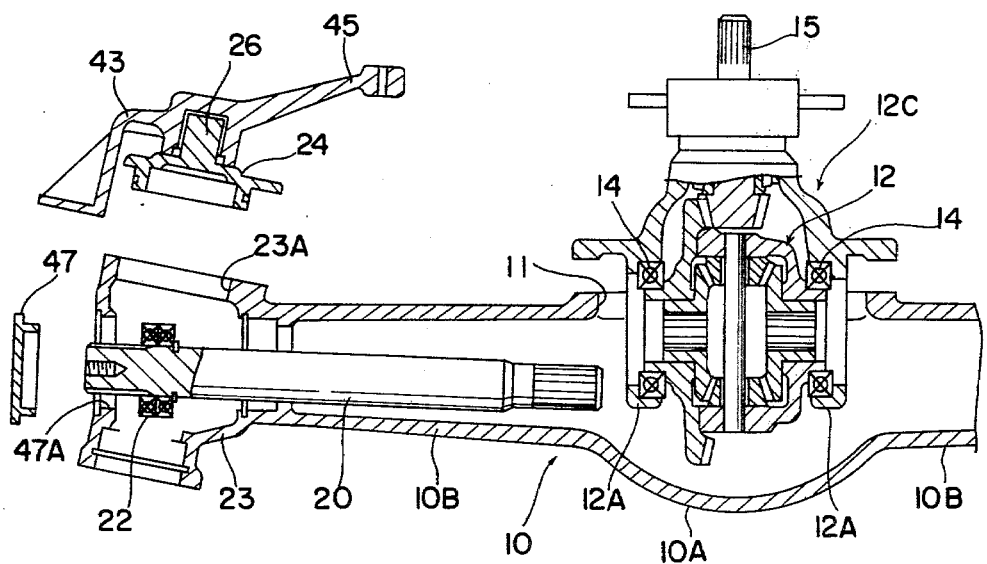
FIG. 4 is a schematic view showing assembling and/or disassembling of the front wheel drive.

As shown in FIG. 4, the bevel pinion 21 is adapted to be installed through the upper opening 23A in the transmission case 23 and the king pin 28 is adapted to be inserted also through this opening 23A.

Figure 5:
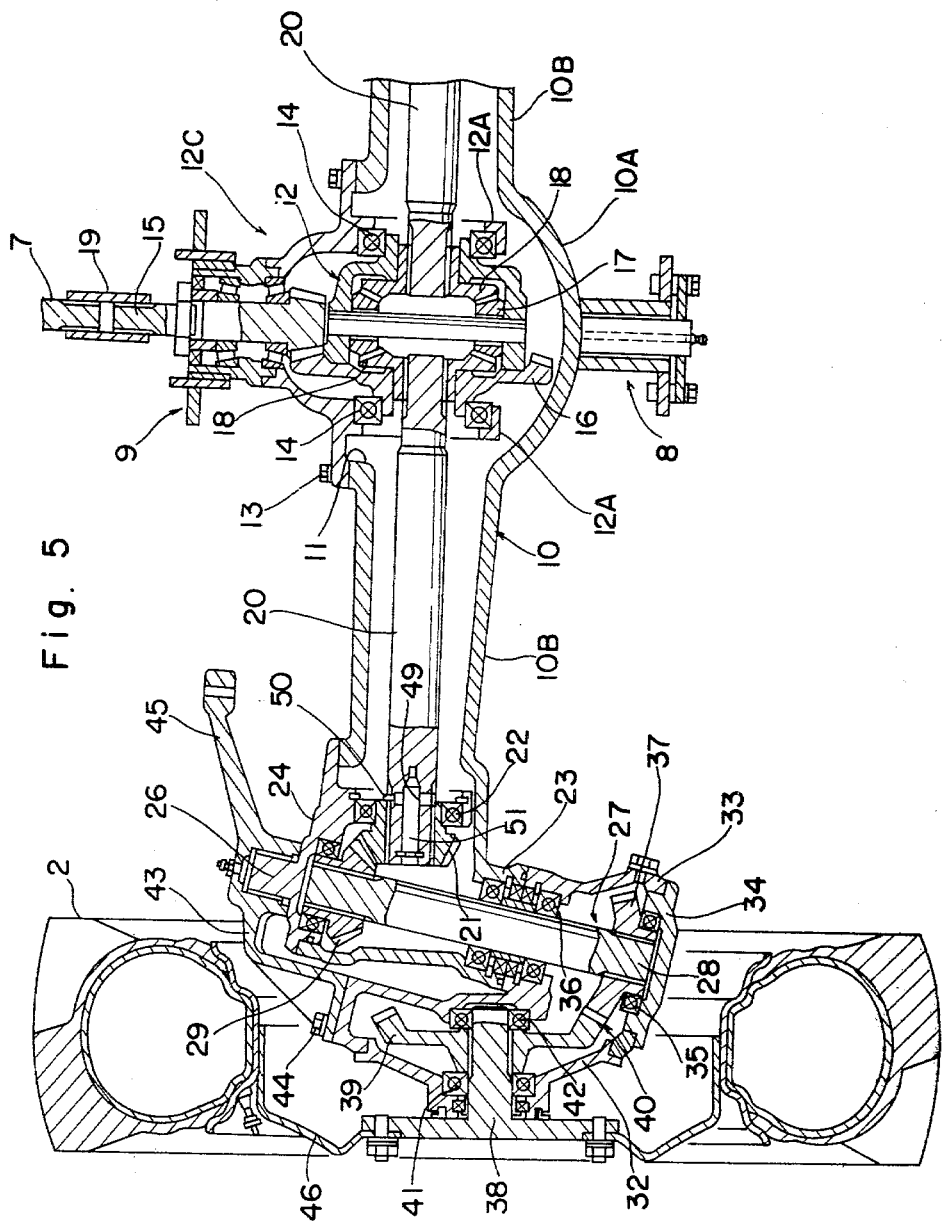
FIG. 5 is a sectional view of a second embodiment of the front wheel drive according to the present invention.

In a second embodiment shown in FIG. 5, the front axle 20 is adapted to be installed through the center casing portion 10A. For this purpose, disposed at the tapped hole 48 is stopper means 49 for preventing the bevel pinion 21 from coming out as shown in FIG. 5. This stopper means 49 comprises a radially movable pin member 50 and a taper pin 51 for retaining the pin member 50.

Steering force from a steering wheel 52 shown in FIG. 1 is adapted to be transmitted to the steering arm 45 by drag link, power steering means or the like, and the front wheels 2 are arranged under the wheel arrayment of the camber angle, caster angle and toe-in.

In the first embodiment of the present invention constructed as shown in FIGS. 2 and 3, the assembling member 12C incorporating the differential gearing 12 is assembled through the opening 11 of the center casing portion 10A and secured by the bolt 13, as shown in FIG. 4.

With the bearings 22 fitted to the front axle 20, the front axle 20 is inserted through the attaching and removing opening 47A for the blind cap 47 and splined to the differential side gear 18, as shown in FIG. 4. The transmission case 23 is then covered by the blind cap 47 and the bevel pinion 21 is splined to the front axle 20 through the opening 23A of the transmission case 23. Then, the transmission 27 comprising the king pin 28 is assembled through the opening 23A and the transmission case 23 is covered by the cover 24 shown in FIG. 4, and subsequently the reduction gearing case 32 and the steering case 43 are installed.

According to the embodiments of the present invention, transmission of torque to the differential gearing 12 causes the reduction transmission 40 to be driven through the front axle 20, the bevel pinion 21 and the transmission 27 comprising the king pin 28 and the bevel pinion 29, thereby to rotatably drive the front wheel 2, whereby traction force and slope going-up force are improved. Transmission of steering force to the steering arm 45 causes the front wheel 2 to be rotated around the king pin 28, so that the front wheel 2 is steered.

In general, because the front wheels are arranged under the wheel arrayment, it will be inevitable that twisting external force is exerted upon the outer ends of the front axle case. If such outer ends are coupled by flanged bolt couplings, it is necessary to secure them with considerably large bolts. Even if thus arranged, there may be cases where bolt cutting occurrences take place, and assembling/disassembling is not easily done.

On the contrary, according to the present invention the front axle case 10 and the transmission cases 23 disposed at the outer ends thereof are cast integrally with each other in the embodiments. Accordingly, such construction facilitates the entire assembling and eliminates the possibility of the front axle case 10 breaking or being deformed, even though twisting external force is exerted. Thus, the durability is greatly improved.

Furthermore, not using bolts or nuts reduces the number of parts, and thereby contributes to the reduction of the manufacturing cost. Moreover, the simple construction in a rigid manner permits the compact design.

We claim:

1. A front wheel drive comprising: a cylindrical front axle case (10) housing front axles (20) and having transmission cases (23) integral therewith, a transmisson (27) rotatably journaled in each of said transmission cases (23) and driven by one of said front axles for driving a front wheel (2), and a transmission case cover (24) removably attached to each of integrally formed said front axle case (10) and said transmission cases (23), said transmission case cover (24) supporting one of said front axles (20) and said transmission (27) at positions adjacent one end thereof respectively.

2. A front wheel drive as set forth in claim 1, further comprising: a steering case (43) supporting said front wheel (2), said transmission case cover (24) having a projecting shaft (26) fitted to said steering case (43) for rotatably supporting same.

3. A front wheel drive as set forth in either claims 1 or 2, wherein: said transmission (27) includes a king pin (28) inclined to have an upper end thereof close to one of said front axles (20), and bevel pinions (29, 37) splined to said king pin (28) adjacent both ends thereof, an upper one of said bevel pinions (29, 37) being above said one of said front axles (20) and in mesh with a bevel pinion (21) splined to said one of said front axles (20) adjacent to an end thereof.

* * * * *